United States Patent [19]

Watson

[11] Patent Number: 5,434,696
[45] Date of Patent: Jul. 18, 1995

[54] ACTIVE ENERGY DIAMETRIC SCANNING

[76] Inventor: Troy M. Watson, 5672 E. Kelso St., Tucson, Ariz. 85712

[21] Appl. No.: 126,876

[22] Filed: Sep. 27, 1993

[51] Int. Cl.⁶ .............................................. G02B 26/08
[52] U.S. Cl. ..................................... 359/214; 359/201; 359/203; 359/216
[58] Field of Search ............... 359/214, 216, 218, 217, 359/219, 201, 203; 250/330, 331, 332, 333, 334

[56] References Cited

U.S. PATENT DOCUMENTS

| | | | |
|---|---|---|---|
| 3,554,628 | 1/1971 | Kennedy | 350/1 |
| 3,632,871 | 1/1972 | Watkins | 359/216 |
| 3,639,765 | 2/1972 | Kleinerman | 250/83.3 H |
| 3,916,196 | 10/1975 | Thompson | 250/347 |
| 4,129,780 | 12/1978 | Laughlin | 250/333 |
| 4,151,415 | 4/1979 | Lipke | 250/333 |
| 4,188,531 | 2/1980 | Pusch | 250/334 |
| 4,520,504 | 5/1985 | Walker et al. | 250/330 |
| 4,703,179 | 10/1987 | Motooka | 250/334 |
| 4,757,200 | 7/1988 | Shepherd | 250/332 |
| 5,013,917 | 5/1991 | Ulich | 250/330 |
| 5,151,812 | 9/1992 | Watson | 359/201 |

Primary Examiner—Loha Ben
Assistant Examiner—Steve Kong
Attorney, Agent, or Firm—J. E. McTaggart

[57] ABSTRACT

A method and a device for diametric active scanning of a forward region using a collimated beam of radiation energy to detect and track target objects by collecting beam energy scattered by the objects. Each scan line of the beam proceeds from an edge of a circular field-of-view through the center to the opposite edge. The azimuthal scan angle is advanced by a constant increment for each successive scan, and scanning progresses uniformly and continuously. A device implementing the method includes a rotor assembly having first and second angled reflectors which rotates within a concentric ring which includes an array of curved reflecting facets. A collimated beam emitted by a radiation source is reflected by the first reflector onto contiguous segments of each successive facet instantaneously aligned with the reflected beam path, the beam being obliquely re-reflected and redirected to the second angled reflector which reflects and redirects the beam so as to scan a rotating pattern of diametric scan traces.

27 Claims, 4 Drawing Sheets

ACTIVE ENERGY DIAMETRIC SCANNING

BACKGROUND OF THE INVENTION

1. Field of the Invention

The present invention relates to electro-optical scanners and more particularly to scanning systems and related enabling mechanisms suited to detection, acquisition and/or tracking of target objects within a generally circular or conical field-of-view (FOV), based on sensing radiation energy, typically in the infrared (IR), visible light, or ultraviolet (UV) region, emitted by a source integral to the scanner and reflected from the objects. The invention is suited to such purposes as: forward-looking infrared (FLIR) active sensing; and detection, acquisition or tracking of terrestrial, airborne and space-based objects.

2. Description of the Related Art

A conventional technique of radiation energy pattern scanning for both passive scanners, i.e., where radiation is self-emitted by detected objects, and active scanners, i.e., where impinging radiation is reflected by detected objects, employs a raster-scan format analogous to the usual scanning of a television screen. The line/frame raster scan format is widely used for its compatibility with two-dimensional detector arrays such as charged-coupled device (CCD) type. However, there are a number of inherent drawbacks and disadvantages. Elaborate gating techniques are required, for example, to handle line and frame rate retrace. Simple image rotation presents complex and time-consuming processing tasks to the operating hardware and software. A small target, whose total height approximates the height of a scanned line, can be sampled only once during each field or frame. Furthermore, with raster scan the resolution is inherently constant over the entire scanned region, although in many applications the requirement for resolution increases strongly toward the center of the region where target acquisition activity tends to concentrate. For this reason, one raster scan approach of known art provides for "super-scan", an auxiliary system for effectively increasing scanning density by a factor of several times over a small region in the center of the field-of-view, for enhancing target acquisition and tracking resolution. Such a two-step (or multi-step) technique imposes burdens of complexity in hardware and supporting software.

Polar scanning offers an attractive alternative from several viewpoints including increased center resolution, continuous scanning progression, and inherent ease of data processing, e.g. data interpretation relating to simple rotation. In addition, an alternate method of defining and modeling a field-of-view is provided, facilitating use of alternate methods and mathematical models during image analysis.

Polar scanning has been proposed and utilized in particular specialized types of field applications, usually in some type of radial mode, as exemplified in well known radar and tracking techniques utilizing a rotating directional antenna. U.S. Pat. No. 3,916,196 to Thomson exemplifies radial type scanning: a 360 degree annular zone is scanned by a first reflecting plane, inclined in front of a fixed optical lens and rotating at twice the speed of a second mirror assembly having a pair of reflecting planes at right angles to each other in an optical path leading to a fixed linear array of IR detector elements.

A nearly hemispheric field of view is provided according to U.S. Pat. No. 4,703,179 to Motooka, wherein a multi-detector, multi-sided focal plane array, rotating on a platform, provides for varying the shape of arrays from a circle sector to rectangular.

A form of sector scanning is also shown in U.S. Pat. No. 4,188,531 to Pusch.

A form of circular scanning is disclosed in U.S. Pat. No. 3,554,628 to Kennedy.

U.S. Pat. No. 5,151,812 to Watson, entitled "Passive Energy Diametric Scanner," which is incorporated herein by reference, discloses a method and device for diametric scanning, wherein scanning of a circular FOV is performed in a continuous incremental manner along successive diametric paths each starting at a point at the circumference and proceeding through the FOV center to the diametrically opposite circumferential point. Target objects in the FOV are detected by means of their self-emitted (i.e., passive) radiation.

There are many applications where, because of high background, low signal-to-noise ratio, or operational constraints, it is essential or desirable to actively search for and track detected objects by scanning a total FOV with a beam of infrared, visible light, or ultraviolet radiation energy having a cross-section several orders of magnitude smaller than the FOV, so that the beam successively irradiates instantaneous fields-of-view (IFOV) which are much smaller than the total FOV. Object(s) within an irradiated IFOV will reflect a small portion of the radiation which may, in principle, be detected either by so-called monostatic detection means collocated with the beam source or by so-called bistatic detection means located elsewhere. If the beam source emits radiation pulses, range and range rate may be measured as with conventional microwave radar sets. In such applications, particularly where target objects tend to cluster towards the center of a total FOV or where a priori tracking information from a relatively coarse sensor is used to cue a finer-tracking sensor, diametric active scanning offers advantages over raster active scanning by providing a smoothly increasing scanning density from the periphery of a field-of-view to its center. In raster-type active scanning systems, a small target whose total height approximates the height of a raster scan-line can be sampled only once during each field or frame. In contrast, diametric-type active scanning enables such an object, when centrally located, to be sampled once during each line scan. Such capability in an active target-tracking system can aid in updating aim-point errors more efficiently and expediently than is possible using raster-type scanning.

In raster-type active scanning, a "flying spot" sequentially scans, with constant dwell time, contiguous IFOV's. In contrast, in diametric-type active scanning, the dwell time along the path of each line-scan can be varied, The rate that the beam-spot moves can be slower towards the center and faster towards the periphery of the FOV.

Other advantages of using diametric scanning in active detection/acquisition/tracking systems are smooth, continuous and sequential IFOV irradiation, with an increasing scanning density of irradiation in the region of greatest interest, viz., towards the center of the FOV, and a decreasing scanning density towards the perimeter of the FOV, where generally there is less interest.

Data processing of a diametrically-imaged FOV can in some instances be more easily implemented than is possible using a raster-scan format, as for example in determining target object rotation.

With the exception of angular offset of one line to the next, all diametrically-imaged scan lines are identical. For example, all lines are bordered by adjacent lines throughout a FOV. This characteristic may allow implementation of a multi-processing environment wherein each diametric line is independently processed by a separate dedicated processor, each processor communicating with neighboring processors so as to collectively perform a high-speed image analysis of the FOV.

OBJECTS OF THE INVENTION

Accordingly, it is a primary object of the present invention to provide an improved active scanning method for detection, acquisition and/or tracking of target objects in a conical three-dimensional region as observed from the vertex, or for examining a flat two-dimensional field-of-view from an offset distance, in which scan resolution increases proportionally toward the center of the scanned region.

Another object of the invention is to provide active scanning of a circular field-of-view as opposed to a rectangular field-of-view.

Another object of the invention is to provide an improved active scanning method for detection, acquisition and/or tracking of target objects disposed at or near the center of a circular field-of-view.

A further object of the invention is to facilitate the processing of non-point source imagery data obtained from active scanning.

Yet another object of the invention is to provide an active scanning method in which IFOV scanning progresses uniformly and continuously.

Other objects of the invention will become evident when the following description is considered with the accompanying drawings.

SUMMARY OF THE INVENTION

The present invention meets the foregoing objects by providing a method and device for active energy diametric scanning wherein a beam of radiation energy scans within a circular FOV in a continuous incremental manner along successive diametric paths, each path starting at a point at the edge of the FOV and proceeding through the center to the opposite edge, and each path being separated from the previous one by a predetermined azimuthal angle of rotation, throughout a full 360 degrees of azimuth. Tracking of an object detected by its reflecting a portion of beam radiation energy impinging on it is readily accomplished by comparing each incoming "working field" (corresponding to an orientation of the beam vis-a-vis a total FOV) with a reference field which can be stored in memory in the form of polar coordinates (r=radial distance from FOV center; $\theta$=azimuthal angle). Diametric scanning facilitates both centroid tracking, where an object is tracked based on selecting its center-of-mass as an aimpoint, and edge tracking, where an aimpoint is determined by observing changes in contrast or brightness at an edge of an object in the FOV. This is because diametric scanning allows target information to be sampled once during each line-scan, enabling expedient determination of aimpoint errors.

Diametric active scanning in accordance with this invention may be implemented by a rotor assembly including first and second transverse angled reflectors, the assembly made to rotate with constant angular speed about an axis which is also the central axis of a collimated beam of infrared, visible light, or ultraviolet radiation emitted by a radiation energy source. In a first preferred embodiment, the source is a short-pulse, high-power laser which emits a coherent collimated beam. In a primary operational mode, the rotor assembly rotates within a stationary circular "facet" ring having an inside surface fitted with a contiguous array of specially shaped facets. Each facet has the same positive (convex) or negative (concave) curvature, or has zero curvature, i.e., is a flat surface. An emitted beam having a generally circular cross-section, after being recollimated by a lens and reflected from the first reflector impinges on a segment of that facet aligned at that instant with the first reflector, the diameter of the impinging beam being at least one order of magnitude smaller than the facet's radius of curvature. Reflecting off the facet segment, the beam is then reflected from the second reflector towards the field-of-view, in an (r, $\theta$) direction determined by the particular facet and segment of that facet from which the beam reflected. Thus, as the rotor assembly rotates and the beam reflected from the first reflector traverses the entirety of a single facet, the outgoing beam moves diametrically across the circular FOV from one edge of the FOV to the other. As the leading edge of each successive facet in the contiguous array of facets becomes aligned with the first reflector, the beam moves diametrically at a slightly different azimuth angle, the angle being advanced by a constant predetermined increment, until the total FOV is actively scanned. Target object(s) illuminated by the beam will reflect a portion of the irradiating energy in the general direction of the active scanner. Reflected energy is collected, either by an optical lens or preferably by a pair of parabolic reflectors, and the resulting signal(s) are amplified and converted into imagery data correlated to (r, $\theta$) directions of the outgoing beam.

In an alternative operational mode, both the rotor assembly and facet ring rotate and in the same direction, i.e., co-rotate, but at different angular speeds. The rotor assembly can be rotating either faster or slower than the facet ring.

In another alternative operational mode, the rotor assembly and facet ring rotate in opposite directions, i.e., counter-rotate, at the same or at different angular speeds.

In a second preferred embodiment in the primary operational mode, a generally circular aperture ring concentric with a stationary facet ring rotates synchronously with a rotating rotor assembly including first and second angled reflectors and a recollimating lens forming a rotor group. In an alternative operational mode, the rotor group co-rotates with respect to the facet ring at different angular speeds. In another alternative operational mode, the rotor assembly and group counter-rotates with respect to the facet ring at the same angular speed or at different angular speeds. In both the co-rotating and counter-rotating modes, the rotor group can be rotating either faster or slower than the facet ring.

A more complete understanding of the present invention and other objects, aspects and advantages thereof will be gained from a consideration of the following description of the preferred embodiment read in conjunction with the accompanying drawings provided herein.

DESCRIPTION OF THE PREFERRED EMBODIMENTS

While the present invention is open to various modifications and alternative constructions, the preferred embodiment shown in the drawings will be described herein in detail. It is to be understood, however, there is no intention to limit the invention to the particular form disclosed. On the contrary, it is intended that the invention cover all modifications, equivalences and alternative constructions falling within the spirit and scope of the appended claims.

Figure 1:
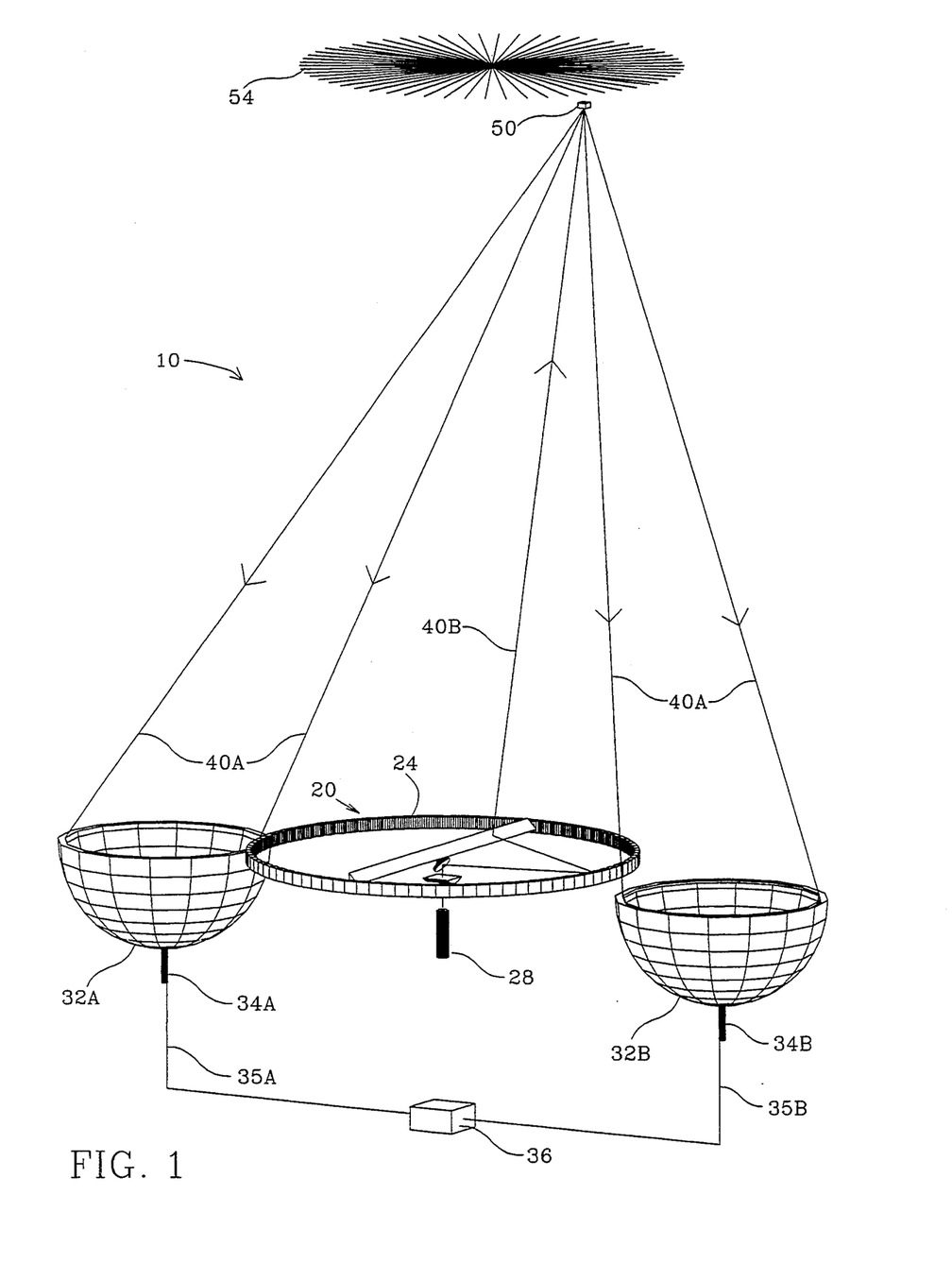
FIG. 1 depicts schematically a perspective view of functional elements of a first preferred embodiment of an active energy diametric scanner, in accordance with the teachings of the present invention.

FIG. 1 shows schematically a perspective view of functional elements of an active energy diametric scanner 10 according to the present invention, including a rotor assembly 20, a facet ring 24, a source of collimated radiation energy 28, first and second radiation collectors 32A and 32B, first and second transducer elements 34A and 34B, and an electronic signal processor 36. Collectors 32A, 32B capture radiation 40A backscattered in the general direction of scanner 10 from a target object 50 illuminated by a radiation energy beam 40B originating at the scanner 10. Energy captured by collectors 32A, 32B is converted to electronic current or voltage signals by transducer elements 34A, 34B, the signals being directed via first and second signal paths 35A and 35B to the processor 36. As shown schematically, the beam 40B scans a circular field-of-view 54 in a continuously incremental manner along successive diametric paths of incremental azimuth.

Figure 2:
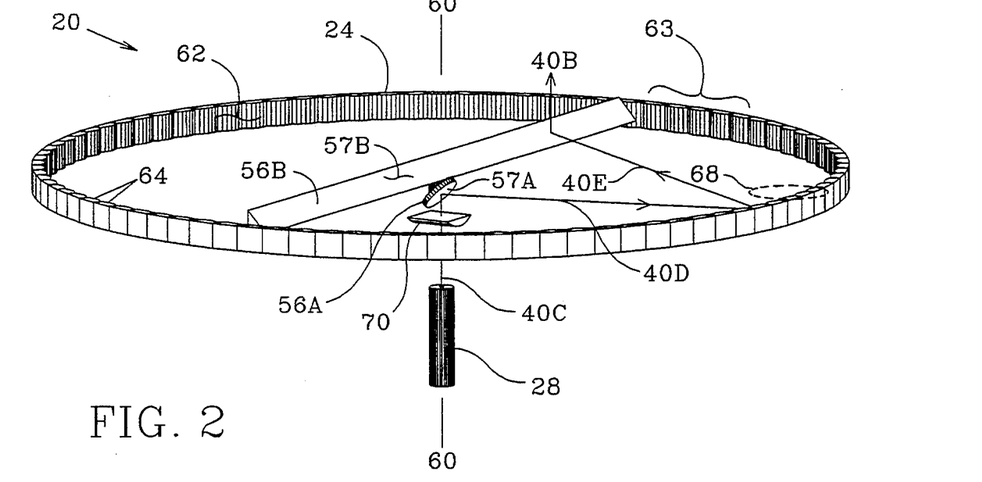
FIG. 2 is a perspective view of functional elements of the FIG. 1 scanner including a rotating rotor assembly with first and second reflectors and a recollimating lens, a source of collimated radiation energy, rotatable and a facet ring.

FIG. 2 shows schematically a perspective view of a first preferred embodiment including the rotor assembly 20, facet ring 24, and radiation source 28. The rotor assembly 20 includes a first angled reflector 56A having a generally circular, highly reflective surface 57A, and a second angled reflector 56B having a planar, generally rectangular, highly reflective surface 57B. Reflectors 56A and 56B are oriented so that surfaces 57A and 57B are each inclined at an angle near 45 degrees with respect to vertical axis 60—60' such that beam 40B is reflected in a vertical plane that contains axis 60—60'. Rotor assembly 20 is made clockwise or counter-clockwise rotational with constant angular speed about axis 60—60'. Thus, reflectors 56A and 56B rotate at the constant speed. Radiation source 28 emits a collimated beam 40C in the infrared, visible light, or ultraviolet region of the electromagnetic spectrum and having a generally circular cross-section, and is oriented so that axis 60—60' is the central axis of beam 40C. Preferably, radiation source 28 is a pulsed laser, so that the beam 40C is coherent and pulsed as well as collimated. Axis 60—60' also passes through the centroid of generally circular and stationary facet ring 24. the ring 24 horizontally disposed so that its median plane transects the horizontal diameter of reflector 56A. Facet ring 24 includes a circumferential inner surface 62 on which is disposed an array 63 of contiguous, highly reflective facets 64, each facet having the same dimensions and curvature. Preferably, the facets have convex curvature and have a longitudinal dimension at least ten times larger than the diameter of beam 40C.

Figure 3:
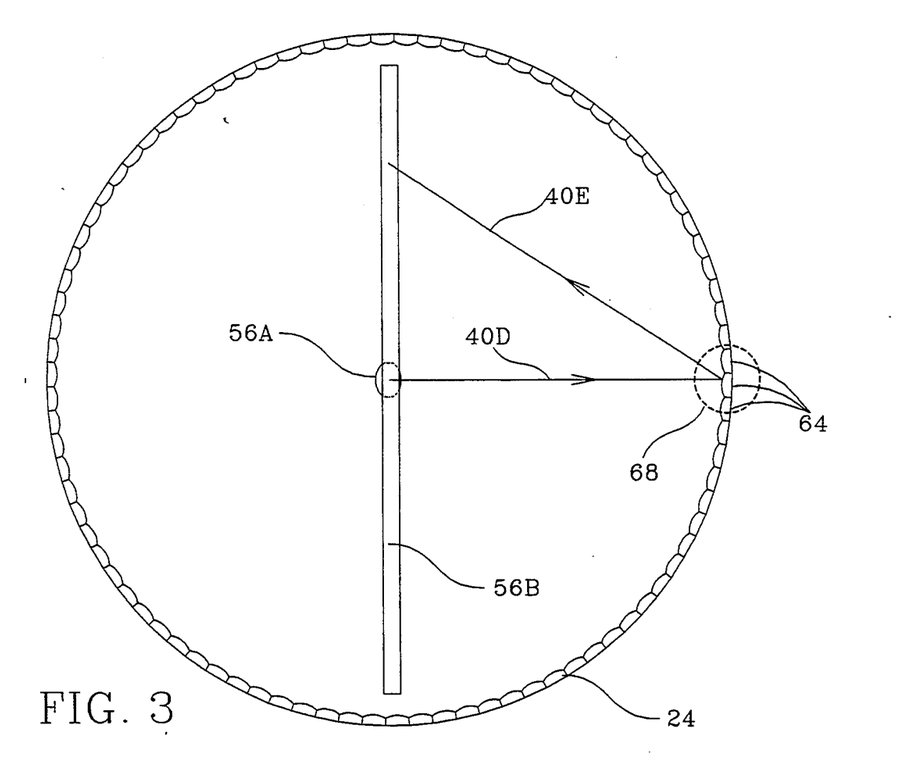
FIG. 3 is a top plan view of the FIG. 2 rotor: assembly and facet ring.

Beam 40C is reflected from surface 57A of first reflector 56A as redirected beam 40D which, as best shown in FIG. 3, impinges on and is reflected by a segment of a facet as redirected beam 40E, the segment centered within the region indicated by the dashed circle 68. The particular facet, facet segment, and angle of reflection of beam 40E are determined by the instantaneous orientation of the rotating reflector 56A vis-a-vis the array 63. Beam 40E impinges on and is reflected from surface 57B of second reflector 56B as redirected beam 40B.

As shown in FIG. 2, the rotor assembly 20 further includes a recollimating lens 70 having a principal axis coinciding with axis 60—60'. The recollimating lens 70 ensures that after beam 40D impinges on the facet 64, beam 40D remains collimated. Thus, lens 70 provides a form of "pre-focusing" or pre-correction to collimated beam 40D before collimation is disrupted by the curved surface of the facet. Preferably, recollimating lens 70 is cylindrical and is interposed between the radiation source 28 and the first reflector 56A. It will be apparent, however, to those skilled in the art of optical system design that alternative lens shapes, locations, and number of lenses can be used along the radiation beam path 40C-40D-40E to compensate for beam divergence caused by facet curvature.

Figure 4A:
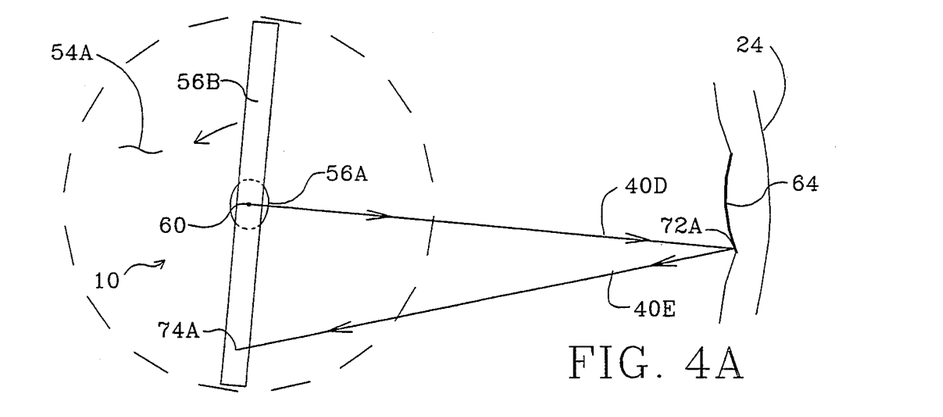
FIGS. 4a and 4b illustrate the process of scanning a radiation energy beam diametrically across a circular field-of-view.
Figure 4B:
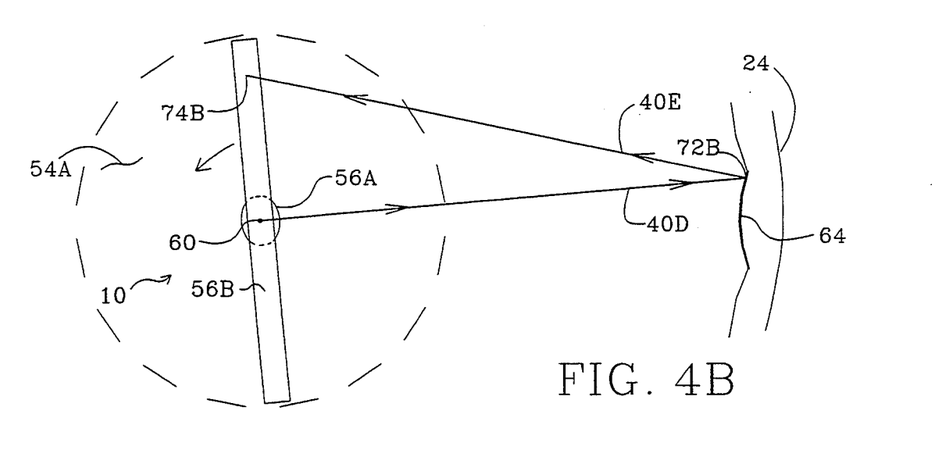

FIGS. 4A and 4B illustrate the interaction of beams 40D and 40E with a convex facet 64 at two points in the process of scanning a single diametric line of the target field-of-view, viz., near the beginning and near the end of the line, respectively. In FIG. 4A, the rotor assembly 20 including first reflector 56A, and second reflector 56B is rotating counterclockwise in the plane of the paper with respect to the stationary facet ring 24. Rotor assembly 20 is instantaneously oriented so that beam 40D is reflected from rotating reflector 56A so as to impinge on segment 72A of facet 64 near one end of the facet, the reflected beam 40E being redirected obliquely so as to impinge on reflector 56B at a point 74A near the edge of a field-of-view 54 in that plane, determined by the rotating reflector 64B. Points in field-of-view 54A correspond one-to-one with points in the target object field of view (54 in FIG. 1). In FIG. 4B, rotor assembly 20 has rotated so that beam 40D reflected from reflector 56A impinges on segment 72B of facet 64 near the opposite end of the facet. The angle of reflection has reversed such that reflected beam 40E, having moved across the FOV in a diametric scanning path, now impinges on reflector 56B at a point 74B near the opposite edge of field-of-view 54A. As rotation of rotor assembly 20 relative to facet ring 24 continues and beam 40D transitions to the next adjacent facet, the reflected beam 40E will immediately return to the opposite end of mirror 56B. Then the above-described sequence will be repeated on the next adjacent facet to scan the next diametric line, and so forth, each successive scanned diametric line being rotated by the angle of resolution chosen for the system, as determined by the number of facets and angular speed of rotor assembly 20.

In an alternative operational mode, the facet ring 24 can be made to rotate with a constant angular speed about axis 60—60' in the same direction as and either faster or slower than the rotating rotor assembly 20. Co-rotational operation allows variation in the curvature of each line scan at the fringes of the FOV. When facet ring 24 rotates at a speed greater than twice the speed of rotor assembly 20, increased scanning speed and scanning density is achieved compared to the scanning speed and scanning density achieved when facet ring 24 is stationary. This is because the relative rotational speed of rotor assembly 20 and facet ring 24 is greater, allowing more facets to affect beam 40E per unit time. When the rotational speeds of rotor assembly 20 and facet ring 24 are synchronous, their relative rotational speed allows each scan line to coincide from one frame to the next, so that each line begins at exactly the same position within the FOV from one frame to the next. The scan lines are stable and non-drifting. An example of such synchronous operation is when the ratio of the angular speeds of rotor assembly 20 and facet ring 24 is an integer.

When rotor assembly 20 and facet ring 24 co-rotate asynchronously, their relative rotational speed is such that the angular placement of each scan line does not coincide with the placement of the previously scan line. Thus, each successive scan line in the FOV is angularly offset so that the scan lines drift from one frame to the next. Co-rotational asynchronous operation allows fringe areas within a FOV to be occasionally scanned, for any cross-sectional area of the beam 40B. As rotation of rotor assembly 20 relative to facet ring 24 continues, each successive scanned diametric line is rotated by the angle of resolution chosen for the system, as determined by the number of facets, the angular speed of rotor assembly 20, and the angular speed of facet ring 24.

In another alternative operational mode, the facet ring 24 can be made to rotate with a constant angular speed about axis 60—60' in the opposite direction to and either faster or slower than, or at the same speed as rotor assembly 20. Counter-rotational operation likewise allows scanning speed and scanning density to be increased because the relative rotational speed of rotor assembly 20 and facet ring 24 is greater than when the facet ring is stationary, allowing more facets to affect beam 40E per unit time. When rotor assembly 20 and facet ring 24 counter-rotate synchronously, their relative rotational speed allows each scan line to coincide from one frame to the next, such that each scan line begins at exactly the same position in the FOV from one frame to the next. In this mode the scan lines are stable and non-drifting. An example of this mode is when the ratio of the rotational speeds of counter-rotating rotor assembly 20 and facet ring 24 is an integer. When rotor assembly 20 and facet ring 24 counter-rotate asynchronously, their relative rotational speed is such that angular placement of each scan line does not coincide with the placement of the previously scan line. Thus, each scan line in the FOV is angularly offset and drifts from one frame to the next. Counter-rotational asynchronous operation enables fringe areas within a FOV to be occasionally scanned, for any cross-sectional area of the beam 40B. As rotation of rotor assembly 20 relative to facet ring 24 continues, each successive scanned diametric line is rotated by the angle of resolution chosen for the system, as determined by the number of facets, the angular speed of rotor assembly 20, and the angular speed of facet ring.

Without special compensation, the diametric scan lines traced by the simplified scanning mechanism shown would not be perfectly straight but would have a slight geometric curvature. This curvature may be reduced in both the co-rotating and counter-rotating operational modes by increasing the rotational speed of facet ring 24 relative to rotor assembly 20. In the co-rotating mode, in order to reduce curvature from that resulting when a stationary facet ring is used, the rotational speed of rotor assembly 20 must be at least twice the rotational speed of facet ring 24. Conversely, as the rotational speed of facet ring 24 approaches the rotational speed of rotor assembly 20, curvature of each scanned line at the fringes of a FOV increases and the scanning speed of the total FOV decreases. In the counter-rotating mode, as the speed of facet ring 24 increases, scan line curvature decreases proportionally. Alternatively, scan line curvature may be minimized by specially shaping the surfaces 57A, 57B, on the angled redirecting reflectors 56A, 56B, to be curved instead of planar. Such compensation can be generally applied by modifying the scanning path towards the ends of each scan line, i.e., at the edge of the field-of-view.

Figure 5A:
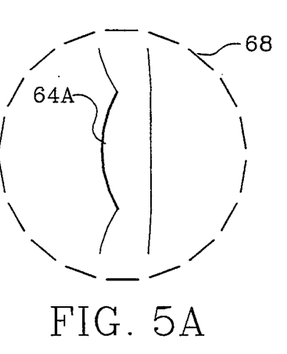
FIG. 5a is an enlarged top plan view of a portion of the FIG. 3 facet ring, showing a facet with convex (or positive) curvature.
Figure 5B:
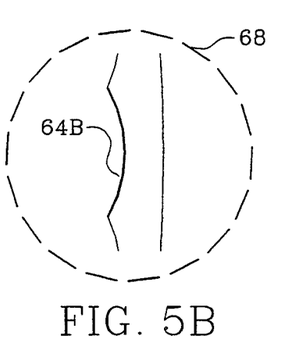
FIG. 5b is an enlarged top plan view of a portion of the FIG. 3 facet ring, showing a facet with concave (or negative) curvature.
Figure 5C:
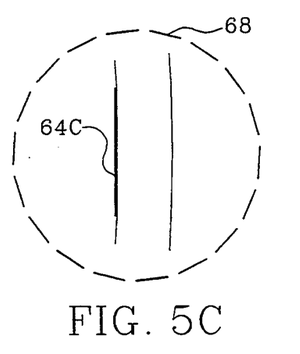
FIG. 5c is an enlarged top plan view of a portion of the FIG. 3 facet ring, showing a flat facet.

FIG. 5A is an enlarged top view of the region 68 showing a preferred embodiment of facets 64 of array 63, wherein each facet 64A has convex curvature. FIG. 5B depicts an alternative embodiment of the facets 64 wherein each facet 64B has concave curvature. With concave facets, the effective scanning deflection moves in the same direction as the direction of rotation of rotor assembly 20. FIG. 5C depicts another alternative embodiment of the facets 64 wherein each facet 64C has zero curvature, i.e., is planar. With planar facets, the scan angle across the face of 56A depends entirely on the number of facets used in the facet ring. A facet ring including 360 facets will provide each facet to scan one degree across the face of reflector 56A, while a facet ring including 90 facets will provide each facet to scan four degrees across the face of reflector 56A.

Use of facets 64A having convex curvature or facets 64B having concave curvature results in the beam 40B exhibiting a non-linear dwell time because beam 40D moves non-linearly across each facet 64A. Beam 40B tends to move slower nearer the center and faster nearer the periphery of field-of-view 54. In contrast, use of planar facets 64C results in beam 40B exhibiting a linear dwell time because beam 40D moves linearly across each facet 64C. Dwell time of beam 40B may be "tailored" by shaping the facets 64A or 64B to have non-constant curvature.

Figure 6A:
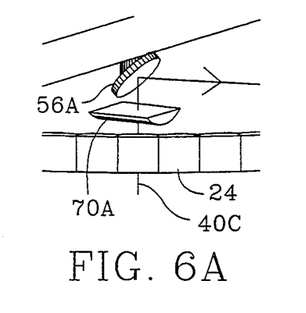
FIG. 6a is a detailed perspective view of the FIG. 2 first reflector and facet ring, and a first embodiment of the FIG. 2 recollimating lens.
Figure 6B:
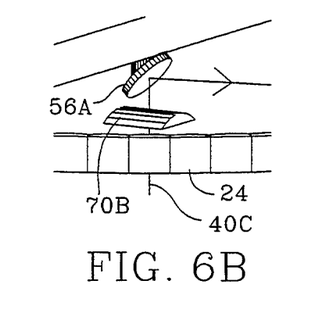
FIG. 6b is a detailed perspective view of the FIG. first reflector and facet ring, and another embodiment of the FIG. 2 recollimating lens.
Figure 6C:
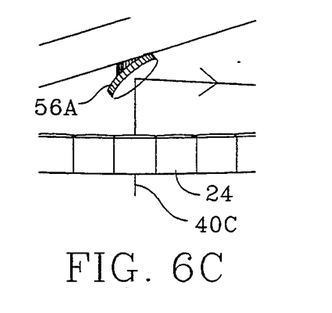
FIG. 6c is a detailed perspective view of the FIG. 2 first reflector and facet ring, without the use of a recollimating lens.

FIG. 6A is a detailed perspective view of a preferred embodiment of the recollimating lens 70 in relationship to a section of facet ring 24 and first reflector 56A, the cylindrical lens 70A used in conjunction with convexly-shaped facets 64A to compensate for dispersion in beam 40E caused by reflection from a facet 64A. FIG. 6B shows an alternative embodiment of lens 70, a cylindrical lens 70B, rotated about a principal axis 180 degrees relative to lens 70A, which produces dispersion opposite to that produced by lens 70A. Lens 70B is used in conjunction with concavely-shaped facets 64B to compensate for conversion (and eventual dispersion) in beam 40E caused by reflection from a facet 64B. FIG. 6C shows another alternative where lens 70 is not required, viz., when planar facets 640 are used.

Figure 7:
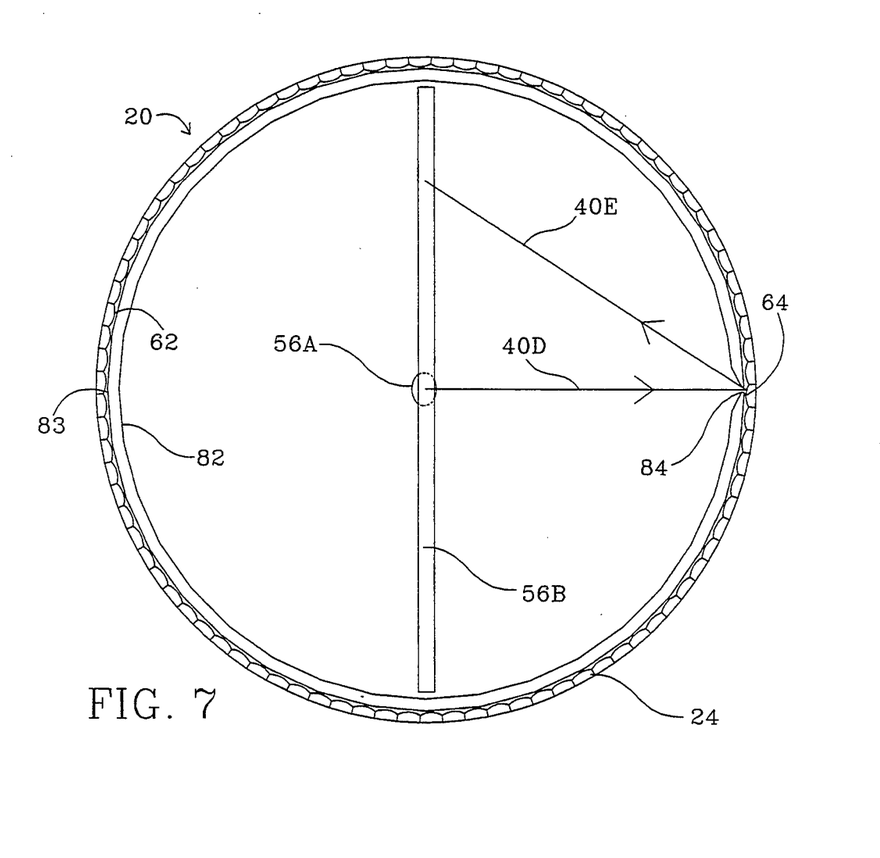
FIG. 7 is a top plan view of a second preferred embodiment of the FIG. 2 scanner elements including a ring having an aperture aligned with the first reflector, the ring rotating at the same angular speed and in the same direction as the rotating rotor assembly, rotatable and the facet ring.

FIG. 7 depicts an alternative preferred embodiment wherein a generally circular aperture ring 82, concentric with the stationary facet ring 24, rotates with first and second reflectors 56A, 56B and recollimating lens 70 of rotor assembly 20. Rotating ring 82 has an outside surface 83 which is slightly smaller in diameter than inner surface 62 of ring 24. Ring 82 includes a circular or slotted aperture 84, the area of aperture 84 being approximately equal to or smaller than the cross-sectional area of beam 40D. Aperture 84 acts to reduce the stray energy that results from beam 40D impinging on the surface of facet 64, thereby increasing the signal-to-noise ratio of the energy being emitted.

What is claimed is:

1. A method for diametrically scanning a forward region to detect and track objects within the region, comprising the steps of:
   generating a collimated beam of radiation energy having a generally circular cross-sectional area;
   sequentially reflecting the collimated beam from a first reflector rotating relative to a concentric ring including a multiplicity of contiguous reflective facets of predetermined and identical conformation, the beam reflected from the first reflector impinging onto one of a plurality of contiguous segments for each successive facet instantaneously aligned with the path of the beam reflected from the first reflector;
   sequentially reflecting the beam from each contiguous segment of each successive facet;
   reflecting the beam reflected from each facet segment from a second reflector rotating at the same angular speed and in the same direction as the first reflector; and
   collecting beam radiation energy scattered from an object within the forward region when the beam reflected from the second reflector impinges on the object.

2. The method of claim 1, wherein the first and second reflectors rotate at a predetermined, constant angular speed relative to the concentric ring.

3. The method of claim 1, further comprising the step of recollimating the beam reflected from each facet segment.

4. The method of claim 1, wherein each reflective facet has a predetermined width and a generally convex curvature.

5. The method of claim 1, wherein each reflective facet has a predetermined width and a generally concave curvature.

6. The method of claim 1, wherein each reflective facet has a predetermined width and is planar.

7. The method of claim 1, wherein the beam cross-sectional area is only a fraction of a facet width.

8. The method of claim 1, wherein the generated beam is laser radiation.

9. The method of claim 8, wherein the laser radiation beam is pulsed.

10. The method of claim 9, wherein the pulsed laser radiation beam is in the visible optical region.

11. The method of claim 9, wherein the pulsed laser radiation beam is in the infrared region.

12. The method of claim 9, wherein the pulsed laser radiation beam is in the ultraviolet region.

13. A device for diametrically scanning a forward region to detect and track objects within the region, comprising:
    means for generating a collimated beam of radiation energy having a generally circular cross-sectional area;
    means for reflecting the collimated beam and sequentially directing the reflected beam onto a plurality of contiguous segments of a multiplicity of contiguous reflective facets;
    means for sequentially reflecting the beam from each contiguous segment of each successive facet;
    means for directing the beam reflected from each facet segment into the forward region; and
    means for collecting beam radiation energy scattered from an object within the forward region when the beam impinges on the object.

14. The device of claim 13, further comprising means for recollimating the beam reflected from each facet segment.

15. The device of claim 13, wherein the means for generating a collimated beam of radiation energy is a laser having a predetermined, constant pulse repetition frequency.

16. The device of claim 13, wherein the means for reflecting the collimated beam and sequentially directing the reflected beam onto a plurality of contiguous segments of a multiplicity of contiguous reflective facets comprises:
    a first angled reflector rotating about an axis at a constant angular speed; and
    a stationary, generally circular ring concentric about the axis, the ring including an inner surface on which are contiguously disposed the reflective facets.

17. The device of claim 13, wherein the means for reflecting the collimated beam and sequentially directing the reflected beam onto a plurality of contiguous segments of a multiplicity of contiguous reflective facets comprises:
    a first angled reflector rotating about an axis at a constant angular speed; and
    a generally circular ring concentric about the axis and rotating at a constant angular speed, the ring including an inner surface on which are contiguously disposed the reflective facets.

18. The device of claim 13, wherein the means for directing the beam reflected from each facet segment into the forward direction comprises a second angled reflector.

19. The device of claim 13, wherein the means for collecting beam radiation energy scattered from an object within the forward region when the beam impinges on the object comprises at least one parabolic reflector.

20. The device of claim 13, wherein the means for collecting beam radiation energy scattered from an object within the forward region when the beam impinges on the object comprises at least one optical lens.

21. A device for diametrically scanning a forward region to detect and track objects within the region, comprising:
- a pulsed laser source emitting a collimated beam of radiation energy having a generally circular cross-sectional area, along a predetermined beam path;
- a rotor assembly comprising a first angled reflector and a second angled reflector, the rotor assembly rotating with a constant angular speed about an axis coinciding with the predetermined beam path;
- a generally circular ring of predetermined inside diameter and having an inner surface, the ring concentric about the axis of rotation of the rotor assembly; and
- a multiplicity of reflective facets having identical predetermined width and curvature, the facets disposed contiguously on the inner surface of the circular ring, and the beam cross-sectional area being only a fraction of a facet width.

22. The device of claim 21, further comprising an optical lens disposed between the laser source and the first reflector, the lens rotating at the same angular speed and in the same direction as the first and second reflectors.

23. The device of claim 21, wherein the generally circular ring is stationary.

24. The device of claim 21, wherein the rotor assembly and the generally circular ring rotate and in the same direction.

25. The device of claim 21, wherein the rotor assembly and the generally circular ring rotate in opposite directions.

26. A device for diametrically scanning a forward region to detect and track objects within the region, comprising:
- a pulsed laser source emitting a collimated beam of radiation energy having a generally circular cross-sectional area, along a predetermined beam path;
- a rotor assembly comprising a first angled reflector and a second angled reflector, the rotor assembly rotating with constant angular speed about an axis coinciding with the predetermined beam path;
- a first generally circular ring of predetermined inside diameter and having an inner surface, the ring concentric about the axis of rotation of the rotor assembly;
- a multiplicity of reflective facets having identical predetermined width and curvature, the facets disposed contiguously on the inner surface of the first ring, and the beam cross-sectional area being only a fraction of a facet width; and
- a second generally circular ring of predetermined outside diameter and including a single aperture, the ring concentric about the axis of rotation of the rotor assembly and rotating at the same angular speed and in the same direction as the first and second reflectors, the outside diameter of the second ring being slightly less than the inside diameter of the first ring.

27. The device of claim 26, further comprising an optical lens disposed between the laser source and the first reflector, the lens rotating at the same angular speed and in the same direction as the first and second reflectors.

* * * * *